United States Patent

Martini et al.

(10) Patent No.: US 7,878,932 B2
(45) Date of Patent: *Feb. 1, 2011

(54) METHOD AND APPARATUS TO MONITOR A VALVE ADAPTED TO CONTROL MODE TO GEAR TRANSITIONS DURING OPERATION OF AN ELECTRO-MECHANICAL TRANSMISSION

(75) Inventors: Ryan D. Martini, Royal Oak, MI (US); Charles J. Van Horn, Novi, MI (US); Peter E. Wu, Brighton, MI (US); Andrew M. Zettel, Ann Arbor, MI (US); Thomas E. Mathews, Pendleton, IN (US); Jy-Jen F. Sah, West Bloomfield, MI (US); Syed Naqi, Ann Arbor, MI (US); Darren Crewes, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

This patent is subject to a terminal disclaimer.

(21) Appl. No.: 11/854,566

(22) Filed: Sep. 13, 2007

(65) Prior Publication Data

US 2009/0075780 A1 Mar. 19, 2009

(51) Int. Cl.
*F16H 3/72* (2006.01)

(52) U.S. Cl. .......................................................... 475/5
(58) Field of Classification Search ...................... 475/5; 477/3
See application file for complete search history.

(56) References Cited

U.S. PATENT DOCUMENTS

| 6,953,409 | B2 | 10/2005 | Schmidt et al. |
| 2007/0099739 | A1 | 5/2007 | Foster et al. |
| 2009/0082150 | A1* | 3/2009 | Wu et al. .......................... 475/5 |
| 2009/0099742 | A1* | 4/2009 | Wu et al. ........................ 701/55 |

* cited by examiner

*Primary Examiner*—Dirk Wright

(57) ABSTRACT

Monitoring operation of an electro-mechanical transmission having a hydraulic circuit with flow management valves and pressure control solenoids to actuate clutches and pressure monitoring devices to monitor the hydraulic circuit is provided. The transmission operates in fixed gear and continuously variable operating range states. The method comprises controlling position of one of the flow management valves to control operation in one of the operating range states. A fault is detected in the one of the flow management valves based upon outputs of the pressure monitoring devices during steady state operation in one of the continuously variable operating range states. A fault is detected in the one of the flow management valves based upon the output of one of the pressure monitoring devices during a transition in the flow management valve.

20 Claims, 5 Drawing Sheets

METHOD AND APPARATUS TO MONITOR A VALVE ADAPTED TO CONTROL MODE TO GEAR TRANSITIONS DURING OPERATION OF AN ELECTRO-MECHANICAL TRANSMISSION

TECHNICAL FIELD

This disclosure pertains generally to control systems for electro-mechanical transmissions.

BACKGROUND OF THE INVENTION

The statements in this section merely provide background information related to the present disclosure and may not constitute prior art.

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline and to wheels of the vehicle. Electric machines, operatively connected to an electrical energy storage device, comprise motor/generators operable to generate motive torque for input to the transmission, independently of torque input from the internal combustion engine. The electric machines are further operable to transform vehicle kinetic energy, transmitted through the vehicle driveline, to electrical energy that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electric machines.

The exemplary electro-mechanical transmissions are selectively operative in fixed gear operation and continuously variable operation through actuation of torque-transfer clutches, typically employing a hydraulic circuit to effect clutch actuation. A fixed gear operation occurs when the ratio of the rotational speed of the transmission output member to the rotational speed of the input member is constant, typically due to actuation of one or more torque-transfer clutches. A continuously variable operation occurs when the ratio of the rotational speed of the transmission output member to the rotational speed of the input member is variable based upon operating speeds of one or more electric machines. The electric machines can be selectively connected to the output member via actuation of a clutch, or directly by fixed mechanical connections. Clutch actuation and deactivation is typically effected through a hydraulic circuit, including electrically-actuated hydraulic flow management valves, pressure control solenoids, and pressure monitoring devices controlled by a control module.

During operation, there is a need to monitor operation to identify a mismatch between a commanded operating range state and an actual operating range state. In such a situation, a mode-gear mismatch may occur, including for example the control system commanding continuously variable operation, when the transmission is actually operating in fixed gear operation. However, operation of the powertrain may mask presence of the mismatch. When this occurs, the control system tries to force engine speed to a calculated optimum speed intended for a continuously variable operation. The result may be an unwanted change in operation of the vehicle. There is a need to effectively identify absence of a mismatch, identify presence of a mismatch, and mitigate effects of any mismatch.

SUMMARY OF THE INVENTION

An electro-mechanical transmission includes a hydraulic circuit having a plurality of flow management valves and pressure control solenoids operative to actuate a plurality of clutches and a plurality of pressure monitoring devices adapted to monitor the hydraulic circuit. The transmission is operative in fixed gear and continuously variable operating range states through selective actuation of the clutches. A method to monitor the operation of the transmission includes controlling position of one of the flow management valves, the one of the flow management valves adapted to selectively control operation of the electro-mechanical transmission in one of the fixed gear and the continuously variable operating range states. A fault in the one of the flow management valves is detected based upon outputs of predetermined ones of the pressure monitoring devices during steady state operation in one of the continuously variable operating range states. And, a fault in the one of the flow management valves is detected based upon the output of one of the predetermined ones of the pressure monitoring devices during a transition in the one of the flow management valves.

DETAILED DESCRIPTION OF A PREFERRED EMBODIMENT

Figure 1:
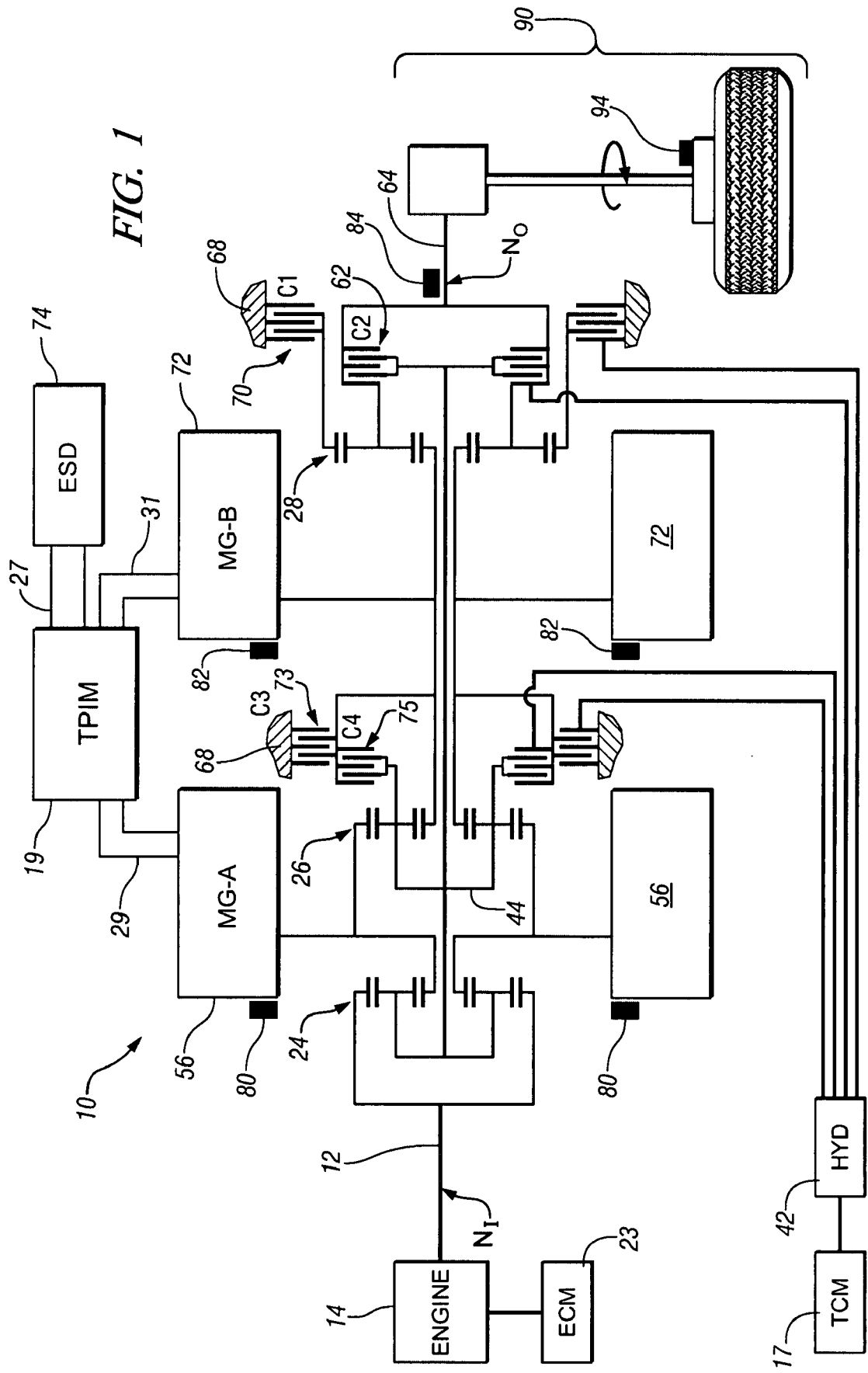
FIG. 1 is a schematic diagram of an exemplary powertrain, in accordance with an embodiment of the present invention.
Figure 2:
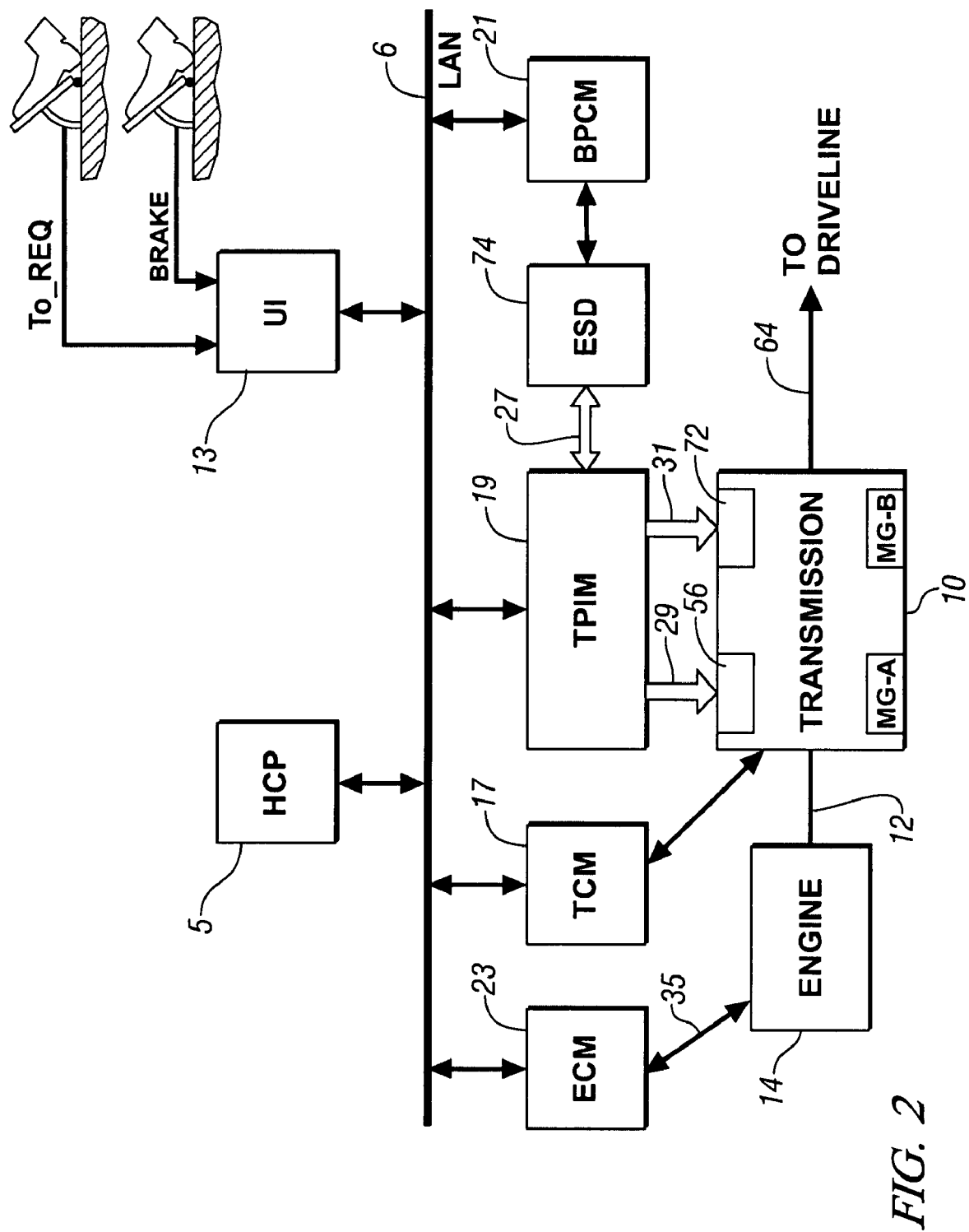
FIG. 2 is a schematic diagram of an exemplary architecture for a control system and powertrain, in accordance with an embodiment of the present invention.

Referring now to the drawings, wherein the depictions are for the purpose of illustrating embodiments of the invention only and not for the purpose of limiting the same, FIGS. 1 and 2 depict a system comprising an engine 14, transmission 10, driveline 90, control system, and hydraulic control circuit 42 (FIG. 4) which has been constructed in accordance with an embodiment of the present invention. The exemplary hybrid powertrain system is configured to execute the control scheme depicted hereinbelow with reference to FIG. 5. Mechanical aspects of the exemplary transmission 10 are disclosed in detail in commonly assigned U.S. Pat. No. 6,953,409, which is incorporated herein by reference. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$.

The exemplary engine 14 comprises a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine, comprising speed $N_E$ and output torque $T_E$ can differ from transmission input speed $N_I$ and engine input torque $T_I$ when a torque management device (not shown) is placed therebetween.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68. Each clutch is preferably hydraulically actuated, receiving pressurized hydraulic fluid from a pump 88 via an electro-hydraulic control circuit 42.

There is a first electric machine comprising a motor/generator 56, referred to as MG-A, and a second electric machine comprising a motor/generator 72, referred to as MG-B operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 comprises a known variable reluctance device including a resolver stator, operably connected to the stator of each electric machine, and a resolver rotor, operably connected to the rotor of each electric machine. Each resolver 80, 82 comprises a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, $T_O$, to vehicle wheels. There is a transmission output speed sensor 84, operative to monitor rotational speed of the output shaft 64. Each of the vehicle wheels is equipped with a sensor 94 adapted to monitor wheel speed, the output of which is monitored by the control system and used to determine absolute wheel speed and relative wheel speed for braking control, traction control, and vehicle acceleration management.

The transmission 10 receives input torque from the torque-generative devices, including the engine 14, and MG-A 56 and MG-B 72, referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A 56 and MG-B 72. The distributed control module architecture includes engine control module (ECM) 23, transmission control module (TCM) 17, battery pack control module (BPCM) 21, and TPIM 19. A hybrid control module (HCP) 5 provides overarching control and coordination of the aforementioned control modules. There is a User Interface (UI) 13 operably connected to a plurality of devices through which a vehicle operator typically controls or directs operation of the powertrain including the transmission 10, including an operator torque request (To_req) and operator brake request (BRAKE). Exemplary vehicle input devices to the UI 13 include an accelerator pedal, a brake pedal, a transmission gear selector, and a vehicle speed cruise control. Each of the aforementioned control modules communicates with other control modules, sensors, and actuators via a local area network (LAN) bus 6. The LAN bus 6 allows for structured communication of control parameters and commands among the various control modules. The specific communication protocol utilized is application-specific. The LAN bus and appropriate protocols provide for robust messaging and multi-control module interfacing between the aforementioned control modules, and other control modules providing functionality such as antilock braking, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: the operator torque request (To_req), the engine input torque $T_I$, clutch torque, $(T_{CL\_N})$ for the N various torque-transfer clutches C1, C2, C3, C4 of the transmission 10; and motor torques $T_A$ and $T_B$ for MG-A 56 and MG-B 72. The TCM 17 is operatively connected to the electro-hydraulic control circuit 42, including for monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine input torque command from the HCP 5, and generates a desired axle torque, and an indication of actual engine input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 (which translate to transmission input speed, $N_I$) manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_N}$) for each of the N clutches, i.e., C1, C2, C3, and C4, and rotational output speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, amp-hour throughput, battery temperature, battery voltage and available battery power.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 3:
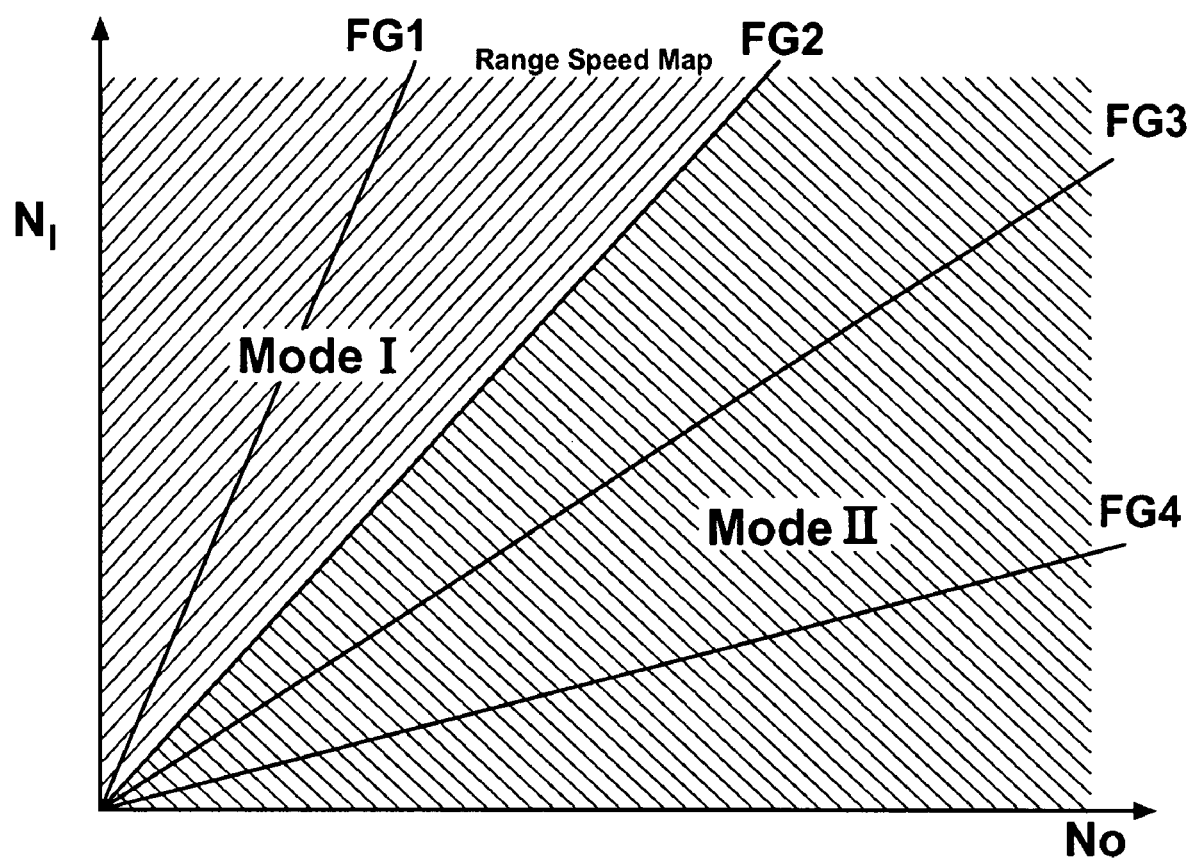
FIG. 3 is a graphical depiction, in accordance with an embodiment of the present invention.

Referring now to FIG. 3, the exemplary two-mode, compound-split, electro-mechanical transmission operates in one of several operating range states comprising fixed gear operation and continuously variable operation, described with reference to Table 1, below.

TABLE 1

| Transmission Operating Range State (Op_range) | Actuated Clutches | |
| --- | --- | --- |
| Mode I - Engine Off (MI_Eng_Off) | C1 70 | |
| Mode I - Engine On (MI_Eng_On) | C1 70 | |
| Fixed Gear Ratio 1 (FG1) | C1 70 | C4 75 |
| Fixed Gear Ratio 2 (FG2) | C1 70 | C2 62 |
| Mode II - Engine Off (MII_Eng_Off) | C2 62 | |
| Mode II - Engine On (MII_Eng_On) | C2 62 | |
| Fixed Gear Ratio 3 (FG3) | C2 62 | C4 75 |
| Fixed Gear Ratio 4 (FG4) | C2 62 | C3 73 |

The various transmission operating range states described in the table indicate which of the specific clutches C1, C2, C3, and C4 are engaged or actuated for each of the operating range states. A first continuously variable operating range state, i.e., Mode I, is selected when clutch C1 70 is actuated in order to "ground" the outer gear member of the third planetary gear set 28. The engine 14 can be either on or off. A second continuously variable operating range state, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating, typically as a result of the engine being decoupled from the transmission. Other factors outside the scope of this disclosure affect when the electric machines MG-A 56 and MG-B 72 operate as motors and generators, and are not discussed herein.

Mode I and Mode II are characterized by single clutch applications, i.e., either clutch C1 62 or C2 70, and by the controlled speed and torque of the electric machines 56 and 72, which can be referred to as a continuously variable transmission mode. Certain operating rage states are described below in which fixed gear ratios are achieved by applying an additional clutch. This additional clutch may be clutch C3 73 or C4 75, as shown in the table, above. When the additional clutch is applied, fixed gear operation of input-to-output speed of the transmission, i.e., $N_I/N_O$, is achieved. During fixed gear operation, the rotations of machines MG-A 56 and MG-B 72, i.e., $N_A$ and $N_B$, are dependent on internal rotation of the mechanism as defined by the clutching and proportional to the input speed measured at shaft 12.

In response to an operator's action, as captured by the UI 13, the supervisory HCP control module 5 and one or more of the other control modules determine the operator torque request to be executed at shaft 64. Final vehicle acceleration is affected by other factors, including, e.g., road load, road grade, and vehicle mass. The transmission operating range state is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The transmission operating range state may be predicated on a powertrain torque demand caused by a control module command to operate one of the electric machines as an electrical generator or as an electric motor. The transmission operating range state can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The energy storage system and electric machines MG-A 56 and MG-B 72 are electrically-operatively coupled for power flow therebetween. Furthermore, the engine, the electric machines, and the electro-mechanical transmission are mechanically-operatively coupled to transmit power therebetween to generate a power flow to the output. In Mode I operation, the transmission operates as an input-split electrically variable transmission (EVT). In Mode II operation, the transmission operates as a compound-split EVT. While operating in either of these two modes, the control system performs closed loop control on an engine speed which optimizes fuel economy while still meeting the torque request and given power constraints. It then commands motor speeds to vary the input-to-output speed ratio to accelerate the vehicle, in response to the operator torque request. Through use of the two additional clutches, the transmission also has the capability of achieving one of four fixed gear ratios. While operating in a fixed gear, the vehicle acts as a parallel hybrid and the motors are used only for boosting and braking/regeneration the vehicle.

Figure 4:
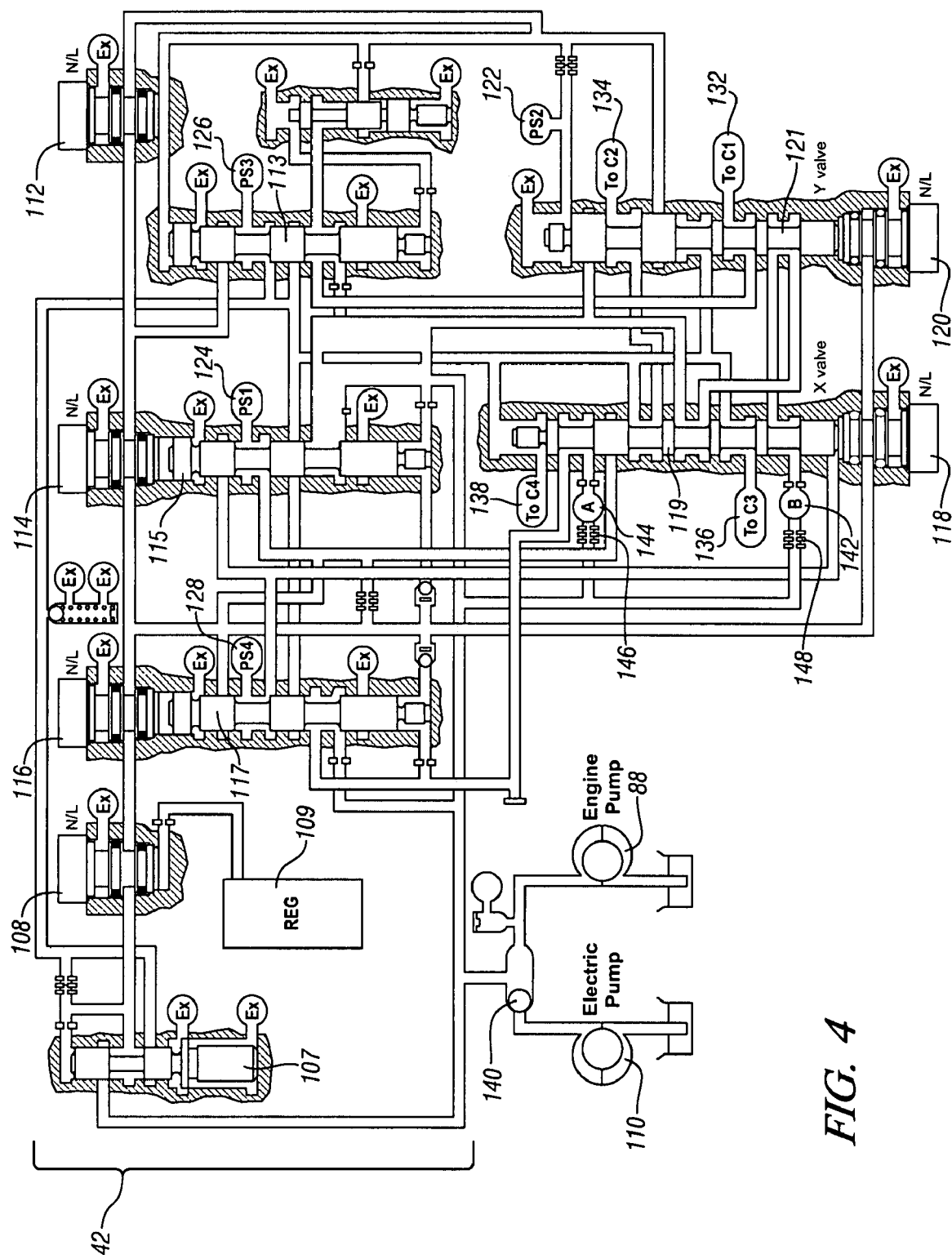
FIG. 4 is a schematic diagram of a hydraulic circuit, in accordance with an embodiment of the present invention; and, FIG. 5 is an algorithmic flowchart, in accordance with an embodiment of the present invention.

Referring to FIG. 4, a schematic diagram is depicted which provides a more detailed description of the exemplary electro-hydraulic system for controlling flow of hydraulic fluid in the exemplary transmission. The main hydraulic pump 88, driven off the input shaft 12 from the engine 14, and auxiliary pump 110, operatively electrically controlled by the TPIM 19, provides pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, active cooling circuits for machines A and B, and a base cooling circuit for cooling and lubricating the transmission 10 via passages 142, 144 (not depicted in detail). As previously stated, the TCM 17 is preferably operable to actuate the various clutches to achieve various transmission operation through selective actuation of hydraulic circuit flow control devices comprising variable pressure control solenoids (PCS) PCS1 108, PCS2 112, PCS3 114, PCS4 116 and solenoid-controlled flow management valves X-valve 119 and Y-valve 121. The circuit is fluidly connected to pressure switches PS1, PS2, PS3, and PS4 via passages 124, 122, 126, and 128, respectively. There is an inlet spool valve 107. The pressure control solenoid PCS1 108 has a control position of normally high and is operative to modulate fluidic pressure in the hydraulic circuit through fluidic interaction with controllable pressure regulator 109. Controllable pressure regulator 109, not shown in detail, interacts with PCS1 108 to control hydraulic pressure in the hydraulic circuit 42 over a range of pressures, depending upon operating conditions as described hereinafter. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High (1) and Low (0). The control states refer to positions of each valve with which to control flow to different devices in the hydraulic circuit 42 and the transmission 10. The X-valve 119 is operative to direct pressurized fluid to clutches C3 and C4 and cooling systems for stators of MG-A 56 and MG-B 72 via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. A more detailed description of the exemplary electro-hydraulic control circuit 42 is provided in commonly assigned U.S. patent application Ser. No. 11/263,216, which is incorporated herein by reference.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS1 Normal High | PCS2 Normal High | PCS3 Normal High | PCS4 Normal Low |
| --- | --- | --- | --- | --- | --- | --- |
| Mode I (MI) | 0 | 0 | Line Modulation | MG-B Stator Cool | C1 | MG-A Stator Cool |
| Mode II (MII) | 0 | 1 | Line Modulation | C2 | MG-B Stator Cool | MG-A Stator Cool |
| Low Range FG1, FG2 MI, MII | 1 | 0 | Line Modulation | C2 | C1 | C4 |
| High Range FG3, FG4 MII | 1 | 1 | Line Modulation | C2 | C3 | C4 |

Selective control of the X and Y valves and actuation of the solenoids PCS2, PCS3, and PCS4 facilitate flow of hydraulic fluid to actuate clutches C1, C2, C3, and C4, and provide cooling for the stators of MG-A 56 and MG-B 72.

In operation, one of the fixed gear and continuously variable operating range states is determined for the exemplary transmission based upon a variety of operating characteristics of the powertrain. This includes an operator torque request, typically communicated through inputs to the UI 13 as previously described. Additionally, a demand for output torque is predicated on external conditions, including, e.g., road grade, road surface conditions, or wind load. Transmission operating range state may be predicated on a powertrain torque demand caused by a control module command to operate of the electric machines as an electrical generator or as an electrical motor. Operation can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system.

Referring now to the transmission described with reference to FIGS. 1, 2, 3, and 4, and Tables 1 and 2, specific aspects of the transmission and control system are described herein. The control system is operative to selectively actuate the pressure control devices and the flow management valves based upon a demand for torque, presence of a fault, and temperatures of the electric motors. The control system selectively commands one of a low-range continuously variable operation, a high-range continuously variable operation, a low range state, and a high range state based upon selective actuation of the X-valve 118 and Y-valve 120 flow management valves. The control system effects actuation of the stator cooling system for the first electric machine (MG-A Stator Cool), the stator cooling system for the second electric machine (MG-B Stator Cool), and the first hydraulically-actuated clutch (C1) based upon selective actuation of the pressure control devices PCS2, PCS3, and PCS4 when the low-range continuously variable operation has been commanded. Furthermore, the control system is operative to effect actuation of the stator cooling system for MG-A 56, stator cooling system for MG-B 72, and the second hydraulically-actuated clutch C2 based upon selective actuation of the pressure control devices when a high-range continuously variable operation has been commanded. The control system is operative to effect actuation of the first, second, and fourth hydraulically-actuated clutches (i.e., C1, C2, C4) based upon selective actuation of the pressure control devices when a low-range state has been commanded, comprising operation in one of FG1, FG2, MI and MII via selective actuation of the clutches. The control system is operative to effect actuation of the second, third, and fourth hydraulically-actuated clutches (i.e., C2, C3, C4) based upon selective actuation of the pressure control devices when a high-range state has been commanded, comprising operation in one of FG2, FG3, FG4, and MI and MII via selective actuation of the clutches.

As previously stated, fluid output from each of the second, third and fourth pressure control devices (i.e., PCS2, PCS3, and PCS4) is selectively mapped to one of the four hydraulically-actuated clutches and stator cooling systems for MG-A 56 and MG-B 72 based upon commanded positions of the first and second flow management valves. Therefore, selective actuation of PCS2 effects flow of hydraulic fluid to provide cooling to the stator of MG-B 72, when both the X-valve and the Y-valve are commanded to Low. Selective actuation of PCS2 effects flow of hydraulic fluid to actuate clutch C2 when either of the X-valve and the Y-valve are commanded to High. Selective actuation of PCS3 effects flow of hydraulic fluid to actuate clutch C1 when both the X-valve and the Y-valve are commanded to Low. Selective actuation of PCS3 effects flow of hydraulic fluid to provide cooling to the stator of MG-B 72 when the X-valve is commanded to Low and the Y-valve is commanded to High. Selective actuation of PCS3 effects flow of hydraulic fluid to actuate clutch C1 when the X-valve is commanded to High and the Y-valve is commanded to Low. Selective actuation of PCS3 effects flow of hydraulic fluid to actuate clutch C3 when both the X-valve and the Y-valve are commanded to High. Selective actuation of PCS4 effects flow of hydraulic fluid to provide cooling to the stator of MG-A 56 when the X-valve is commanded to Low, regardless of the position to which the Y-valve is commanded. Selective actuation of PCS4 effects flow of hydraulic fluid to actuate clutch C4 when the X-valve is commanded to High, regardless of the position to which the Y-valve is commanded.

Figure 5:
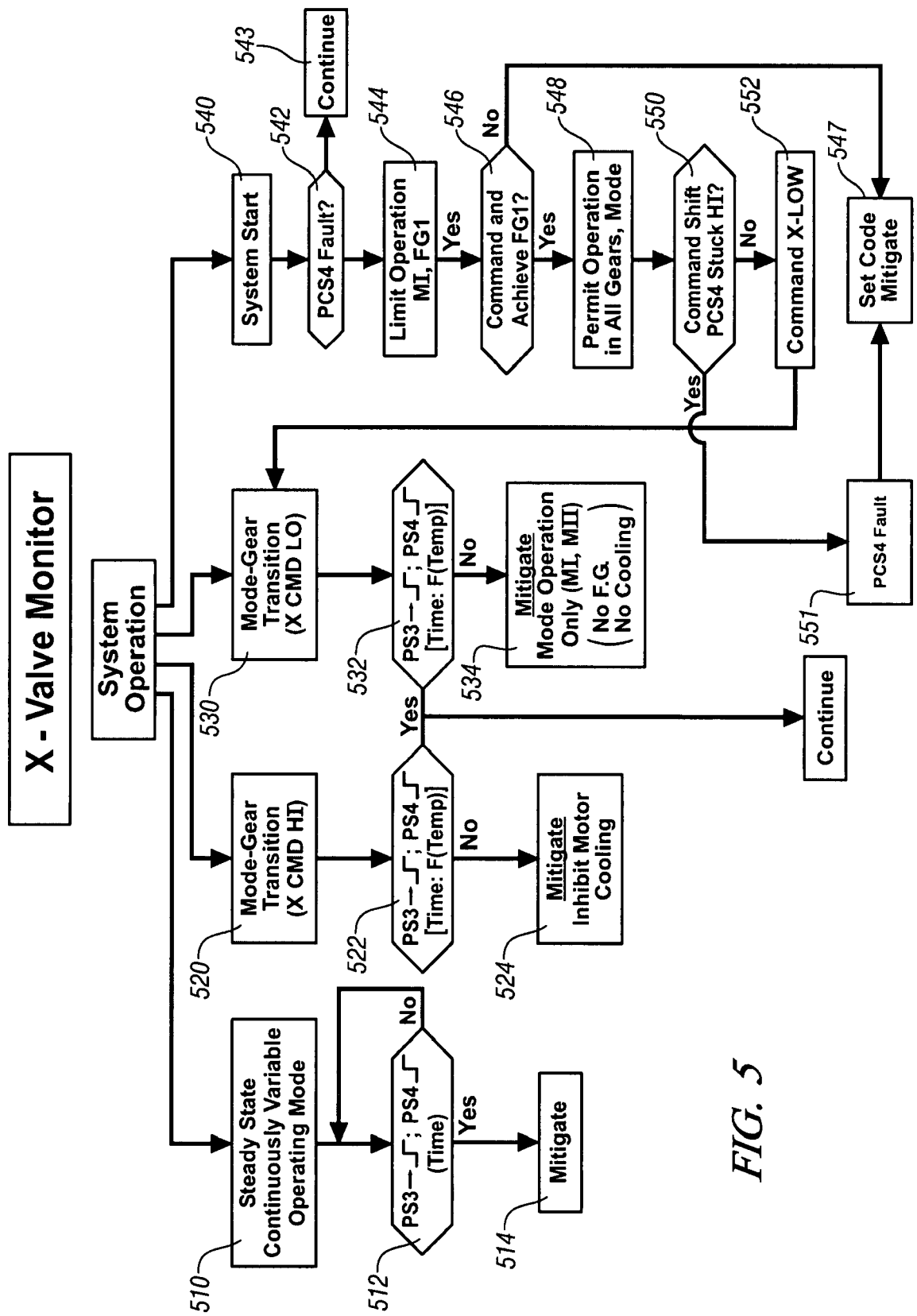

Referring now to the flowchart depicted in FIG. 5, with reference to the exemplary transmission described with reference to FIGS. 1, 2, 3, and 4, and Tables 1 and 2, specific aspects of controlling and monitoring operation of the exemplary transmission are described. In operation, the electro-mechanical transmission is commanded by one of the control modules to operate in one of the continuously variable operating range states, i.e., either MI or MII, through selective actuation of either clutch C1 or clutch C2, including the X-valve 119 controlled to a low logic state. This includes ongoing operation in the continuously variable mode, wherein there is no transition out of the continuously variable mode, operation comprising a transition from fixed gear mode to the continuously variable mode, and during system startup wherein the vehicle operates initially the continuously variable mode. Operation of the transmission is monitored, including hydraulic pressures in the hydraulic circuit.

In each of the continuously variable operating range states only one clutch is applied, which corresponds to one pressure control solenoid (PCS) in the hydraulically high state for the exemplary embodiment. The hydraulic system is designed such that if a hardware fault occurs affecting either of the remaining two pressure control solenoids while operating in either MI or MII, the only result is motor stator cooling. It can be seen with reference to Table 2 that in either of MI or MII, the X-valve 119 is in a hydraulically low state. If there is a fault in the X-valve causing it to remain in a hydraulically high state, a single fault in one of the PCS devices can lead to an unacceptable operating condition. For example, were the X-valve to have a fault causing it to remain 'HIGH', the vehicle continues to operate in MI by operating in the 'Low Range' state and commanding PCS3 hydraulically high. However, any subsequent fault on PCS2 in HIGH position may result in application of clutch C2, with a corresponding mismatch, in that Mode M1 is commanded, whereas GR2 is executed in the transmission.

The invention comprises monitoring the X-valve to identify faults related thereto, including, e.g., a fault with the solenoid 118 or a fault causing the spool valve to stick, i.e., remain in a fixed position. Monitoring comprises monitoring outputs of the pressure switches, specifically PS3 126 and PS4 128. Monitoring occurs during steady state operation in one of the continuously variable operating range states, during any transition between MI or MII continuously variable operating range states, and during vehicle start-up, subsequent to a key-off event. A fault is identified in the one of the flow management valves based upon the outputs of one or both the pressure switches PS3 126 and PS4 128. This is now described in detail.

The X-valve 119 multiplexes flow between the PCS solenoids and valves, and routes hydraulic flow between the clutches used in one of the fixed gears, and MG-A 56 and MG-B 72 cooling. Additionally, the X-valve is used to redundantly disengage gear clutches, to remediate faults related inadvertent actuation of an additional clutch, referred to as a three-clutch tie-up, a mode-gear mismatch, and, a neutral-mode mismatch. There is a potential for a mode-gear mismatch when inputs to the control system indicate the system is operating in either of MI or MII, and a clutch is unintentionally applied, inadvertently placing the transmission in a fixed gear mode as a result of a fault related to the X-valve. There is a potential for a three-clutch tie-up when the vehicle is operating in one of the fixed gears, and fault occurs in one of the PCS devices, resulting in application of a third clutch as a result of a fault related to the X-valve. The mode-gear mismatch and three-clutch tie-up have the potential to occur only if the X-valve is in the hydraulically high state. Any fault which results in the X valve remaining in the hydraulically high state is preferably detected expeditiously.

Methods for monitoring the X-valve, in the form of algorithms, are executed in one or more of the control modules during ongoing operation. Operation of the transmission is monitored, including hydraulic pressures in the hydraulic circuit. During ongoing operation in the continuously variable mode, wherein there is no transition out of the continuously variable mode (510), the monitoring scheme includes detecting an unintended transition from a hydraulically low to a hydraulically high state when not commanded, resulting in the valve being stuck high in steady state operation. During a transition from fixed gear mode to the continuously variable mode (520), the monitoring scheme detects whether the X-valve is stuck in a hydraulically high state after being commanded to a hydraulically low state, resulting in being stuck high in transition; and detects whether the X-valve is stuck in a hydraulically low state after being commanded to a hydraulically high state, resulting in being stuck low in transition. During system startup wherein the vehicle operates initially the continuously variable mode, the monitoring scheme detects whether the X-valve is stuck in bore at vehicle start-up, carrying over from a previous key-on cycle. Upon detection of a fault in the X-valve in any of the modes described, the control system executes actions to mitigate effects of the X-valve fault.

The tables above demonstrate that fixed gear operation requires the X-valve to the hydraulically high state, whereas both MI and MII operation can be achieved with the X-valve in either hydraulically high or low states. During ongoing operation, when either MI or MII is commanded, states EVT Lo or EVT Hi are requested, respectively. Each of the continuously variable operating states requires application of a single clutch corresponding to one of the pressure control solenoids (PCS) controlled in the hydraulically high state. A hardware fault that affects either of the remaining two pressure control solenoids while operating in either EVT Lo or EVT Hi results in motor cooling, i.e., MG-A Stator cool and MG-B Stator cool, respectively.

The first monitoring scheme comprises monitoring the X-valve 119 during steady-state operation, typically in one of the continuously variable operating modes, to detect an unintended transition from a hydraulically low to a hydraulically high state when not commanded, resulting in the valve being stuck high in steady state operation (512). In the mechanization described hereinabove, the X-valve state is be determined by monitoring the pressure switches associated with PCS2 and PCS4, i.e., PS3 and PS4. When the X valve transitions from high to low or low to high, both PS3 and PS4 toggle, or invert, their current state, and outputs of both PS3 and PS4 are monitored to detect such toggling. An unintended toggling may caused by a mechanical fault occurring with the solenoid 118. In operation, when the vehicle is operating in either MI or MII, the X-valve is commanded in a hydraulically low state. A fault occurring in the solenoid which results in pressurizing the X-valve pressurizes causes both PS3 and PS4 to toggle. Thus when PS3 and PS4 toggle simultaneously (i.e., within a calibratable time window), there is an indication that the X-valve solenoid has been pressurized, and the X-valve moved to a hydraulically high state. A software flag is set, and the control module modifies the control strategy to address the fault and mitigate and eliminate risks (514). When the software flag remains set for a pre-calibrated period of time, a software code is set and the vehicle operator is informed, typically via illumination of a dashboard lamp. Mitigation includes inhibiting the control system from commanding any gear or motor cooling. In this case, operation is permitted only in MI and MII, and shifts between MI and MII through neutral are not permitted. On the next key cycle, the steady state detection must re-detect the fault. This detection scheme uses two pressure switch states to determine the position of the X valve.

The second and third monitoring schemes comprise monitoring the X-valve 119 during X-valve transitions, resulting in a mode-gear transition. The potential fault, as referred to as 'stuck in bore', occurs when the spool of the valve is physically jammed against the valve body typically due to contaminated transmission fluid. The algorithm is executed in conjunction with a shift command from a Low Range operation to MI, or a High Range operation to MII, during which the X-valve is commanded to the low state.

The second monitoring scheme comprises monitoring a mode-gear transition wherein the X-valve is commanded to a hydraulically high state, X-CMD-HI (520). This monitoring scheme is executed in conjunction with a command to shift from one of the mode operating states to the corresponding range operating state, as depicted with reference to Table 2. The monitoring system seeks to identify a transition, indicated by toggles of the PS4 and PS3 pressure switches (522), which are expected to occur within a given elapsed time period after the X-valve command. The time window is calibratable and is a function of transmission fluid temperature, e.g., colder temperatures having longer elapsed times to allow for slower solenoid movement. When the pressure switches toggle as expected, operation continues. If the pressure switches do not toggle within the elapsed time period, movement of the X-valve cannot be confirmed, and it is determined that the X-valve is stuck low in transition. The software flag is set, and the control module modifies the control strategy to address the fault and mitigate and eliminate risks, primarily by inhibiting cooling (524). When the software flag remains set for a pre-calibrated period of time, a software code is set and the vehicle operator is informed, typically via illumination of a dashboard lamp. Some shifting between gears is permitted resulting in ongoingly retesting the system. If the X-valve subsequently moves, it is detected, and the mitigation is discontinued. On the next key cycle, the steady state detection must re-detect any fault.

The third monitoring scheme comprises monitoring a mode-gear transition wherein the X-valve is commanded to a hydraulically low state, X-CMD-LO (530). This monitoring scheme is executed in conjunction with a command to shift from one of the range operating states to the corresponding mode operating state, as depicted with reference to Table 2. The monitoring system again seeks to identify a transition, indicated by toggles of the PS4 and PS3 pressure switches (532), which are expected to occur within a given elapsed time period after the X-valve command. Again, the time window is calibratable and is a function of transmission fluid temperature, e.g., colder temperatures having longer elapsed times allow for slower solenoid movement. When the pressure switches toggle as expected, operation continues. If the pressure switches do not toggle within the elapsed time period, movement of the X-valve cannot be confirmed, and it is determined that the X-valve is stuck high in transition. The software flag is set, and the control module modifies the control strategy to address the fault and mitigate and eliminate risks, by permitting operation in the mode operating range state. Operation in one of the fixed gears is not permitted, and cooling is not permitted. Furthermore, operation is permitted only in MI and MII, and shifts between MII and MI through neutral are not permitted (534). When the software flag remains set for a pre-calibrated period of time, a software code is set and the vehicle operator is informed, typically via illumination of a dashboard lamp. The mitigation continues for the key-cycle, unless a pass is subsequently detected. On the next key cycle, the steady state detection must re-detect the fault.

The fourth monitoring scheme comprises monitoring the X-valve 119 at vehicle start-up from a previous key-on cycle (540), in order to detect a stuck-in-bore fault that may not have been detected before key-down during the previous engine-on cycle, and to verify previously identified faults. On key up and system start, the control system commands Neutral operation, with both the X and Y valves commanded in a hydraulically low state. The steady state X valve monitoring described above looks for both PS3 and PS4 to be incorrect in order to determine the X valve to be high. If the X-valve is stuck in bore, the PS3 pressure switch reads hydraulically low. The result, on key-up, is that only PS4 provides an unexpected reading in the event of a stuck valve, the cause of which can include a fault with either of the PCS4 or PS4 devices. Therefore, at controller wakeup, when PCS4 is determined to be stuck high by the hydraulic detections (542), another software flag is set, comprising a X_valve_stuck_Hi_on startup flag. When PCS4 is not determined to be stuck, normal operation continues (543). The X_valve_stuck_Hi_on_startup flag inhibits actions of Stator A cooling and the PCS4 stuck high detection. Furthermore, the X_valve_stuck_Hi_on_startup flag inhibits operation in any one of MII, and FG2, FG3 and FG4. Operation is only permitted in MI and FG1, including disabling monitoring of PCS4 (544). During normal operation, when the control system commands FG1 (546), which includes a command to the X-valve to transition to HIGH state, the X-valve is monitored to detect the transition to FG1. If operation in FG1 is not commanded and achieved within a preset time period, a code is set, and mitigation happens (547). The mitigation strategy comprises inhibiting motor cooling, as described in Step 524.

When FG1 operation is achieved, normal operation of the transmission is permitted (548), and monitoring of PCS4 is re-enabled to permit detection during a transition. During normal operation, when a shift command out of FG1 occurs, PCS4 is monitored, to determine if it is stuck HIGH (550), and if so, a PCS4 fault is identified, and appropriate action is taken, including identifying presence of the PCS4 fault (551), and a code is set, and mitigation happens (547). If a PCS4 fault is not identified, normal operation continues, with an expectation for a commanded mode-gear transition which commands the X valve to LOW (552). The control system monitors the transition as previously described with reference to Steps 530, 532, and 534.

The invention has been described with specific reference to the disclosed embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to monitor operation of an electro-mechanical transmission including a hydraulic circuit having a plurality of flow management valves and pressure control solenoids operative to actuate a plurality of clutches and a plurality of pressure monitoring devices adapted to monitor the hydraulic circuit, said transmission operative in fixed gear and continuously variable operating range states through selective actuation of the clutches, the method comprising:
controlling position of one of the flow management valves, the one of the flow management valves adapted to selectively control operation of the electro-mechanical transmission in one of the fixed gear and the continuously variable operating range states;
detecting a fault in the one of the flow management valves based upon outputs of predetermined ones of the pressure monitoring devices during steady state operation in one of the continuously variable operating range states; and,
detecting a fault in the one of the flow management valves based upon the output of one of the predetermined ones of the pressure monitoring devices during a transition in the one of the flow management valves.

2. The method of claim 1, wherein detecting the fault in the one of the flow management valves during steady state operation in one of the continuously variable operating range states comprises determining outputs of two of the predetermined pressure monitoring devices associated with the flow management valve toggle within a predetermined period of time.

3. The method of claim 2, further comprising limiting actuation of the flow management valves and the pressure control solenoids to control operation in the continuously variable operating range states subsequent to detecting a fault.

4. The method of claim 1, wherein detecting the fault in the one of the flow management valves during the transition in the flow management valve comprises determining an output of one of the predetermined pressure monitoring devices associated with the flow management valve toggles within a predetermined period of time subsequent to a commanded transition.

5. The method of claim 4, further comprising limiting actuation of the flow management valves and the pressure control solenoids to control operation in the continuously variable operating range states subsequent to detecting a fault.

6. The method of claim 1, further comprising
monitoring the one of the predetermined ones of the pressure monitoring devices during start-up;
determining the one of the flow management valves is operating properly when a signal output of a selected one of the predetermined pressure monitoring devices associated with the flow management valve responds as expected; and,
preliminarily identifying a fault in the one of the flow management valves when the signal output of the one of the predetermined pressure monitoring devices associated with the one of the flow management valves does not respond as expected.

7. The method of claim 6, further comprising:
limiting operation of the powertrain subsequent to preliminarily identifying the fault in the one of the flow management valves;
commanding operation in a fixed gear; and
determining presence of the fault in the one of the flow management valves based upon output from the one of the predetermined ones of the pressure monitoring devices.

8. The method of claim 7, further comprising limiting actuation of the flow management valves and the pressure control solenoids to control operation in the continuously variable operating range states subsequent to determining presence of the fault.

9. Method to operate a powertrain, said powertrain including an internal combustion engine and a plurality of electric machines coupled to an electro-mechanical transmission, mechanically-operatively coupled to transmit mechanical power flow to an output through selective actuation of torque-transfer clutches, the electric machines electrically-operatively coupled to an energy storage system for electric power flow therebetween, the method comprising:
adapting a hydraulic circuit to selectively actuate the torque transfer clutches including adapting a flow management valve to selectively transition the transmission between a fixed gear operating range state and a continuously variable operating range state;
monitoring pressure monitoring devices adapted to monitor the hydraulic circuit during steady-state operation and during transitions between the fixed gear and the continuously variable operating range states; and
detecting a fault in the flow management valve based upon the outputs of the pressure monitoring devices during the steady-state operation and during transition between the fixed gear and the continuously variable operating range states.

10. The method of claim 9, wherein detecting a fault in the flow management valve further comprises:
controlling the flow management valve to selectively operate the transmission in the continuously variable operating range state;
detecting a fault in the flow management valve when outputs of two of the pressure monitoring devices adapted to monitor the flow management valve toggle within a predetermined period of time during operation in the continuously variable operating range state.

11. The method of claim 10, further comprising limiting operation of the powertrain to the continuously variable operating range state subsequent to detecting a fault in the flow management valve.

12. The method of claim 9, further comprising:
controlling the flow management valve to transition operation of the transmission between the fixed gear operating range state and the continuously variable operating range state; and,
detecting a fault in the flow management valve when an output of one of the pressure monitoring devices adapted to monitor the flow management valve does not toggle within a predetermined period of time subsequent to the commanded transition.

13. The method of claim 12, further comprising:
detecting the flow management valve is operating as intended when the output of the pressure monitoring device adapted to monitor the flow management valve toggles within the predetermined period of time subsequent to the commanded transition.

14. The method of claim 12, further comprising limiting operation of the powertrain to the continuously variable operating range state subsequent to detecting a fault in the flow management valve.

15. The method of claim 9, further comprising:
monitoring during start-up one of the pressure monitoring devices adapted to monitor the flow management valve;
determining the flow management valve is operating properly when a signal output of the pressure monitoring device adapted to monitor the flow management valve responds as expected; and,
preliminarily identifying a fault in the flow management valves when the signal output of the pressure monitoring device does not respond as expected.

16. The method of claim 15, further comprising:
limiting operation of the powertrain subsequent to preliminarily identifying the fault in the flow management valve;
commanding operation in a fixed gear; and
determining presence of the fault in the flow management valve based upon the output from the pressure monitoring device.

17. Method to monitor a hydraulic circuit adapted to control an electro-mechanical transmission selectively operative in fixed gear and continuously variable operating range states, said hydraulic circuit comprising flow management valves and pressure control solenoids operative to actuate a plurality of torque transfer clutches, and a plurality of pressure monitoring devices adapted to monitor the hydraulic circuit, the method comprising:
controlling position of one of the flow management valves adapted to selectively transition the transmission between fixed gear operation and continuously variable operation;
detecting a fault in the one of the flow management valves based upon outputs of predetermined ones of the pressure monitoring devices during steady state operation in one of the continuously variable operating range states; and,
detecting a fault in the one of the flow management valves based upon the output of one of the predetermined ones of the pressure monitoring devices subsequent to a command to change position in the one of the flow management valves.

18. The method of claim 17, wherein detecting a fault in the one of the flow management valves based upon outputs of predetermined ones of the pressure monitoring devices during steady state operation in one of the continuously variable operating range states comprises detecting a fault in the one of the flow management valves when outputs of two of the pressure monitoring devices adapted to monitor the flow management valve toggle within a predetermined period of time during operation in the continuously variable operating range state.

19. The method of claim 18, further comprising limiting operation of the powertrain to the continuously variable operating range state subsequent to detecting a fault in the one of the flow management valves.

20. The method of claim 17, wherein detecting a fault in the one of the flow management valves based upon the output of one of the predetermined ones of the pressure monitoring devices subsequent to a command to change position in the flow management valve comprises:
controlling the one of the flow management valves to transition operation of the transmission between the fixed gear operating range state and the continuously variable operating range state; and,
detecting a fault in the one of the flow management valves when an output of one of the predetermined pressure monitoring devices adapted to monitor the flow management valve does not toggle within a predetermined period of time subsequent to a commanded transition.

* * * * *